Feb. 13, 1968 — W. R. KING — 3,368,710
PRESSURE VESSEL COVER
Filed April 11, 1966 — 2 Sheets-Sheet 1

William R. King
INVENTOR.

BY
ATTORNEY

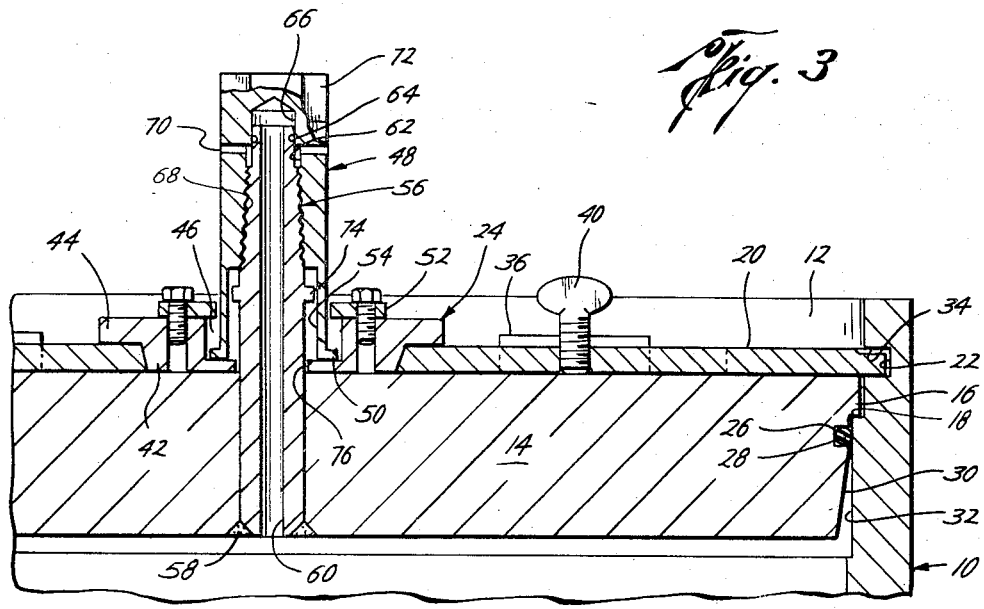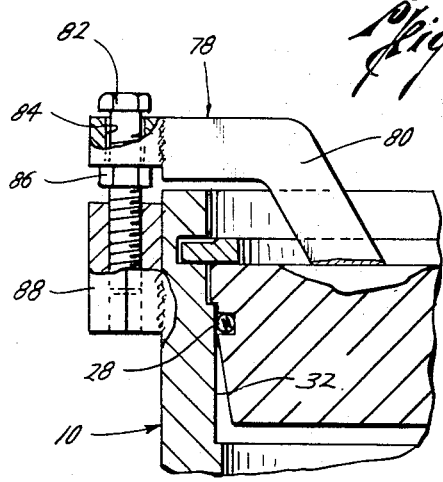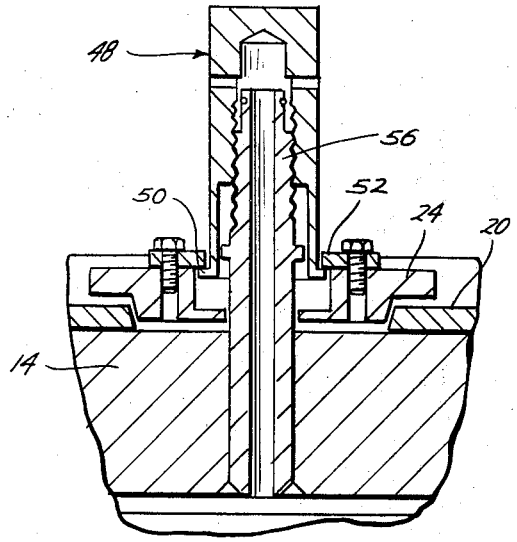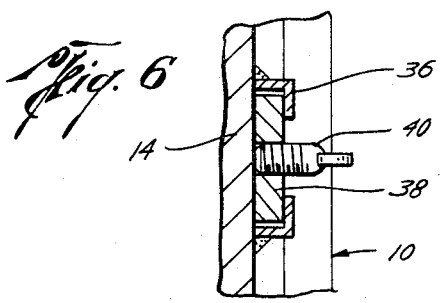

United States Patent Office 3,368,710
Patented Feb. 13, 1968

3,368,710
PRESSURE VESSEL COVER
William R. King, 201 Betty Drive,
Longview, Tex. 75601
Filed Apr. 11, 1966, Ser. No. 541,553
10 Claims. (Cl. 220—44)

This invention relates to closures for pressure vessels, and more particularly it relates to removable closures for vessels adapted to carry high pressures in which means are provided to insure that all pressure is relieved from the vessel before removing the closure.

In the prior art safety devices have been known for pressure vessel closures to relieve the pressure from the vessel before an attempt is made to remove a cover member. This is necessary in order that injury to personnel may be prevented when the closure is loosened. According to the present invention, safety means are provided to insure that the closure member cannot be loosened from the pressure vessel until it has been vented. In the apparatus of this invention a closure capable of holding a very high pressure is provided and the closure member is readily attached to the pressure vessel and is also easily removed therefrom.

It is an object of this invention to provide a pressure vessel closure which cannot be fully assembled without a safety device positioned so as to avoid the possibility of disassembling the closure without operating the safety device.

Another object of the invention is to provide a safety pressure vessel closure which is easily assembled onto the pressure vessel even though it is of such a thickness and weight as to provide a high strength closure.

Still another object of the invention is to provide a pressure vessel closure which insures maintenance of a pressure seal under varying pressures without danger of the pressure deforming the closure so as to loosen the seal.

The accomplishment of these and other objects of the invention will become more apparent after consideration of the accompanying drawings wherein:

FIGURE 3 is an enlarged partial sectional view drawn to show certain elements of the embodiment of FIGURES 1 and 2 in more detail;

FIGURE 4 is a fragmentary sectional view showing a portion of the structure of FIGURE 3 with the elements in different relation to each other;

Figure 1:
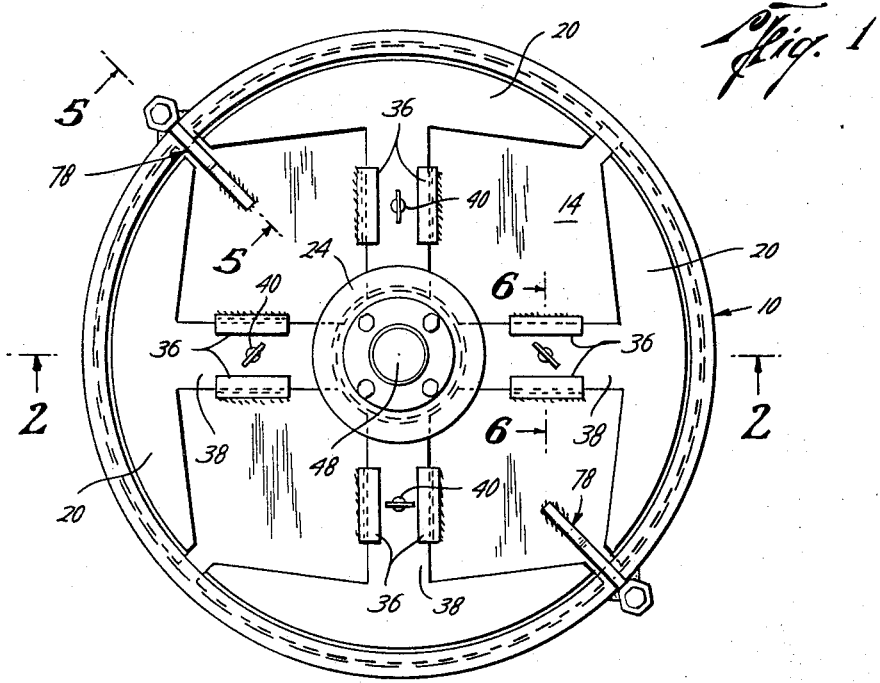
FIGURE 1 is a plan view of a preferred embodiment of the closure of this invention.
Figure 2:
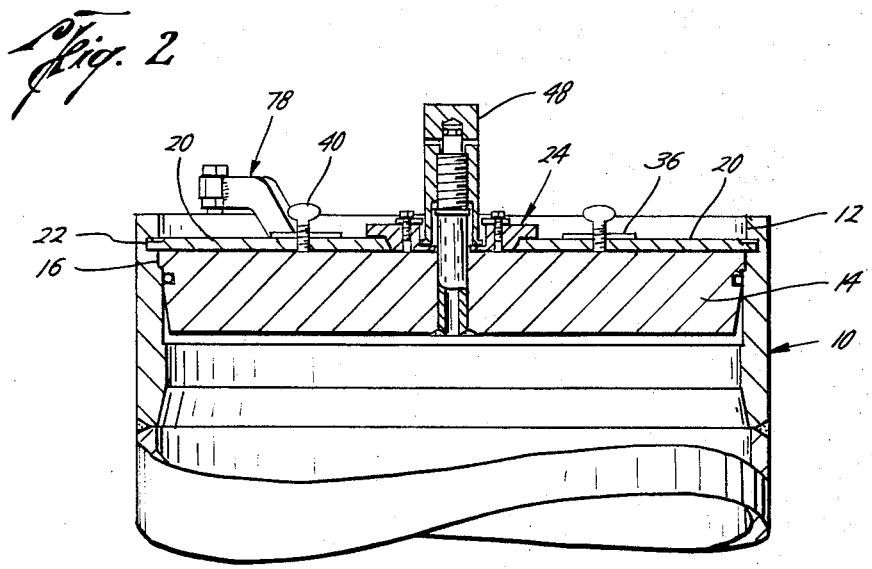
FIGURE 2 is a vertical sectional view of the embodiment of FIGURE 1 taken at line 2—2 of FIGURE 1.

FIGURE 5 is an enlarged fragmentary view of a portion of the structure shown in FIGURES 1 and 2 taken at line 5—5 of FIGURE 1; and FIGURE 6 is an enlarged fragmentary sectional view of the portion of the embodiment of FIGURE 1 taken at line 6—6 of FIGURE 1.

The drawings show the embodiment of the invention in which a pressure vessel 10 has an open top 12 within which a cover member 14 is removably received. The cover member is provided with a flange 16 on its upper edge which rests upon an upwardly facing shoulder 18 (see FIGURE 3) within the open top of the pressure vessel. The cover member is retained in position by means of a plurality of radially slidable latch members 20, four being used in the embodiment shown in the drawing, which are movable into an annular inwardly extending groove 22 formed within the open top of the pressure vessel above the upwardly facing shoulder 18. The latch members are held in position by means of a latch securing device 24.

For a more detailed description of the elements of the embodiment shown in the drawing reference is now made to FIGURES 3, 5 and 6 of the drawing. As particularly shown therein the cover member 14 is provided just below the flange 16 with a groove 26 for receiving a conventional O-ring seal member 28. The portion of the cover member immediately below the O-ring 28 is tapered as at 30. The O-ring seal member 28 sealingly engages a bore 32 of the pressure vessel. It will be appreciated that in order to insure efficient sealing action by the O-ring against the bore 32 the diameter of the bore 32 and the diameter of the cover member immediately above the groove 26 must be held within close tolerances of only a few thousandths of an inch and that the clearance between the respective diameters cannot exceed a few thousandths of an inch. However, in the structure of the present invention it is only at this point that such close tolerances and clearances are required, and the flange 16 may have and preferably does have, a loose fit with wide tolerances within the bore of the pressure vessel above the shoulder 18. Similarly, the tapered portion 30 of the cover member below the groove 26 may have a very loose fit within the bore 32 of the pressure vessel.

The thickness of the cover member is required in order to prevent bulging of the center of the cover member under high pressure which could destroy the seal and could blow the cover member out of the vessel. The cover member is prevented from being moved upwardly by the pressure due to the engagement of the latch members 20 in the groove 22. It will be appreciated that the upper wall of the groove 22 constitutes an annular downwardly facing shoulder 34 against which the upper surfaces of the edges of the latch members bear when the pressure vessel is under pressure. As shown in the drawing some clearance may be left around the periphery of the groove and between the upper surface of the latch members and the downwardly facing shoulder 34 since close fits are not required here in order to obtain efficient inter-action of the parts. It is only necessary that the vertical dimensions be such that the O-ring seal is carried within the bore 32 in order that a seal may be maintained.

The latch members 20, as may be seen in FIGURE 1, each comprise a generally arcuate segment, the sum of the arcs preferably being something less than 360°, and each arcuate segment has a substantially centrally disposed, radially inwardly extending, generally rectangular portion 38 thereon through which forces may be transmitted to the arcuate segments to move them into engagement with the groove 22. The inner end of each portion 38 has a concave tapered arcuate form proportional to be engaged by the latch securing device 24.

As previously stated, the latch members 20 are radially slidable on top of the cover member 14 and are retained in engagement with the cover member by means of guide members 36. Each guide 36 comprises, as more clearly shown in FIGURES 1 and 6, a pair of L-shaped devices which overhang an inwardly extending generally rectangular portion 38 of each latch member so that the rectangular portion 38 slides radially inwardly or outwardly within the guide member. When a latch member has been moved to its radially outermost position it may be locked in this position by means of a thumb screw 40 which is threadedly received in the rectangular portion 38 and may be tightened to bear against the upper surface of the cover member 14.

The latch securing device 24 comprises a frusto-conical portion 42 on its lower end and a radially extending flange portion 44 on its upper end. The length or thickness of the frusto-conical portion 42 is preferably substantially the same as or less than the thickness of the latch members 20 so that the lower surface of the flange 44 may bear downwardly on the top surface of the latch members. The latch securing device has a centrally disposed upwardly opening cavity 46 therein, into which is received a vent cover 48, and the bottom of the cavity has a centrally disposed opening 76.

The vent cover 48 comprises a generally cylindrical member having an annular flange 50 circumscribing its lower end, which annular flange fits within the cavity 46 of the latch securing device. A centrally apertured cap 52 is bolted to the top of the latch securing device and has the body of the vent cover 48 loosely received therethrough, the cap extending radially inwardly over the cavity 46 further than the diameter of flange 50 on the vent cover. Thus, the vent cover flange 50 is held between the cap 52 and the bottom of the cavity 46, so that when the vent cover is installed in the latch securing device it may not be lifted upwardly any substantial distance without lifting the latch securing device, and the latch securing device cannot be lifted without first lifting the vent cover.

The vent cover is provided with a downwardly opening bore 54 into which is received an upwardly extending vent member 56 which is attached, as by a weld 58, to the cover member 14 and which has a fluid passageway 60 therethrough which provides a vent from below the cover to the upper end of the vent member.

The upper end of the vent member 56 is provided with a reduced diameter portion 62 which is sealingly received, as by means of an O-ring 64, within a bore 66 near the upper end of the vent cover 48. Between the bore 66 and the bore 54 in the cover member there is provided an intermediate bore 68 which is threaded through at least a portion of its length so as to threadedly engage corresponding threads on the vent member 56. The intermediate bore is provided with at least one radially extending aperture 70 which extends all the way through the wall of the vent cover so as to provide communication between the bore 68 and the exterior of the vent cover. The vent cover preferably is provided at its upper end with a hexagonal shape 72, or other shape suitable for engagement by a tool, for rotating the vent cover. Below the threads engaging the bore 68 of the vent cover, the vent member has an annular outwardly extending flange member 74 having a diameter which will prevent the opening 76 at the bottom of the latch securing device from passing over it.

In the embodiment of the invention shown, means are also provided for lifting the cover member within the pressure vessel opening far enough to insure that the O-ring is clear of the upwardly facing shoulder 18 when it is desired to remove the cover from the pressure vessel. In the embodiment shown, two such lifting devices 78 are illustrated, although it will be apparent that a larger number may be advisable in some instances. This structure of the lifting devices is shown in detail in FIGURE 5 in which there appears an upwardly and outwardly extending arm 80 whose outer extremity extends beyond the outside diameter of the pressure vessel 10 and has loosely received therethrough a double-headed bolt 82. The double-headed bolt is formed by dropping an ordinary bolt through a vertically extending aperture 84 in the end of arm 80 and welding a nut 86 to the bolt below the arm. The bolt 82 is threadedly received in a threaded ear 88 which is, in the embodiment shown, welded to the exterior of the pressure vessel 10. It will be appreciated that the pressure vessel cover member may, by means of the lifting devices, be lifted far enough that the O-rings 28 will clear the bore 32 of the pressure vessel, by merely rotating the bolts 82.

The use and operation of the pressure vessel closure of the invention should be apparent from the foregoing description. The term "pressure vessel closure" as used herein is intended to comprise the cover member and elements attached thereto as well as cooperating elements of the pressure vessel required to assemble the cover member onto the pressure vessel. In assembling the closure member of this invention it will be apparent that the latch members 20 are positioned within the guides 36 with the outer arcuate portion of the latch members positioned radially inwardly from the diameter of the flange 16 of the cover member. The latch securing device 24 is permanently held in position over the upwardly extending vent member 56 by the interlocking of flange 50 on the vent member with the bottom of the cavity 46, and the vent cover 48 may be screwed down onto the vent member so that the lower end flange 50 on the vent cover is received within the cavity 46 of the latch securing device. The cap 52 may then be placed onto the latch securing device and bolted in place. The entire assembly may then be placed into the open top of the pressure vessel with the bolts 82 positioned over the ears 88 on the pressure vessel. The bolts 82 are then threaded into the ears 88 to lower the cover member into place until the flange 16 seats upon the upwardly facing shoulder 18. The thumb screws 40 are loosened and the latch members are moved radially outwardly until the outer segmented portions of the latch members move into the groove 22. The thumb screws 40 are then tightened. It will be appreciated that the vent cover 48 was not previously screwed all the way down on the vent member 56, but instead these elements were left in the relationship shown in FIGURE 4. In this position it will be apparent that the latch securing device 24 may be moved upwardly and downwardly with respect to the vent cover and with respect to the latch members 20. However, after the latch members 20 are moved out into the groove 22 the latch securing device 24 will drop downwardly so that its tapered portion 42 falls between the conical ends of the latch members and the flange 44 rest on top of the latch members. At this point the vent cover 48 may then be tightened down to the position shown in FIGURE 3 so that its lower flange 50 rests upon the bottom of the cavity 46 in the latch securing device and prevents the latch securing device from being removed. Thus, the latch securing device effectively prevents retraction of the latch members.

In order to retract the latch members it is necessary to first loosen the vent cover so that the latch securing device may be lifted upwardly to allow the latch members to be moved radially inwardly from the groove 22. Such unscrewing of the vent cover 48 pulls the O-ring seal member 64 from the upper bore 66 of the vent cover so as to allow an open passageway from below the cover member 14 through the fluid passageway 60, the bore 66 and the apertures 70 through which fluid pressure within the pressure vessel may be relieved. Thus, before it is possible to retract the latch devices it is necessary to vent the pressure vessel.

It will be apparent also that when the pressure is fully relieved from the pressure vessel the relatively large clearances between the flange 16 and the bore of the pressure vessel and between the latch members and the walls of the groove 22 will provide ready movement of the elements with respect to each other even though a substantial amount of corrosion might have taken place during the time that the cover was in place. Thus, for removal of the cover member it is only necessary to first back off the vent cover to allow any pressure remaining in the vessel to escape, then to raise the latch securing device 24 so that the latch members may be retracted, and loosen thumb screws 40 and slide the latch members radially inwardly in the guides 36. Because no close tolerances are used, the latch members are easily moved to the desired position. Then the cover may readily be lifted by operation of the bolts 82 in the ears 88 on the outside of the pressure vessel. As soon as the cover member has been lifted far enough that the O-ring 28 clears the bore 32 of the pressure vessel and the bolts 82 are fully unscrewed from the ears 88, the cover member may be readily removed by lifting by one edge, since the tapered portion 30 thereon allows the cover member to be rocked into or out of the pressure vessel without binding.

A major advantage of the structure of this invention is the use of wide tolerances and clearances throughout with the exception of the O-ring seal groove and its mating surface. Such wide tolerances and clearances greatly reduce the difficulties normally encountered in assembly and disassembly of the closure member and in maintaining a seal under often adverse conditions such as are found in the field.

Although a preferred embodiment of the invention has been shown or described herein, it is understood that the invention is not limited to such preferred embodiment but instead is limited only as set forth by the appended claims.

I claim:

1. A pressure vessel closure comprising
   an annular upwardly facing shoulder within the pressure vessel,
   an annular downwardly facing shoulder within the pressure vessel above the upwardly facing shoulder and having an inside diameter at least substantially as large as the outside diameter of the upwardly facing shoulder,
   a cover member resting on said upwardly facing shoulder,
   an O-ring seal circumscribing said cover member,
   a plurality of latch members on said cover member adapted to be moved radially outwardly to engage said downwardly facing shoulder,
   an upwardly extending vent member on said cover member forming a fluid passage from below said cover member to above said cover member,
   a vent cover adjustably engaging the upper end of the vent member and having a first position closing the upper end of the vent member and a second position opening said vent member to the atmosphere,
   a latch securing device adapted to be positioned in a first position to prevent retraction of said latch members and in a second position to allow such retraction,
   and means on said vent cover holding said latch securing device in said first position when said vent cover is in said first position and allowing movement of said latch securing device to said second position when said vent cover is in said second position.

2. A pressure vessel closure as defined by claim 1 wherein
   said vent cover comprises a cylindrical member threadedly engaging said vent member, and has a portion at its upper end adapted to sealingly engage the upper end of said vent member when in said first position, and has means thereon for downwardly engaging said latch securing device to hold in place.

3. A pressure vessel closure as defined by claim 1 wherein
   said latch members each have an inner end engageable by said latch securing device to prevent retraction of said latches from the downwardly facing shoulder.

4. A pressure vessel closure comprising
   a circular cover member having upper and lower ends,
      an annular flange circumscribing the upper end of said cover member, and
      an O-ring seal circumscribing said cover member just below said annular flange
      the portion of said cover member between the O-ring seal and the lower end of the cover being tapered,
      the annular flange having a diameter substantially smaller than the opening in which it is to be placed,
      and the body of the cover at the O-ring seal having a diameter such as to form a satisfactory O-ring seal with the opening in which it is to be placed,
   and means on said cover member adapted to engage a pressure vessel to hold the cover member in the pressure vessel.

5. A pressure vessel closure comprising
   a cover member adapted to be placed in sealing position on a pressure vessel,
   latch means adapted to hold said cover member in said sealing position,
   vent means providing a fluid passageway from inside said pressure vessel to outside said pressure vessel, and
   latch securing means adapted to close said fluid passageway including vent cover means operable to release said latch means only after opening said fluid passageway.

6. A pressure vessel closure as defined by claim 5 wherein
   said vent cover means is adjustable to a first position closing said fluid passageway and a second position opening said fluid passageway, and has means thereon engageable with said latch securing means on movement to said first position to prevent operation of said latch securing means to release said latch means.

7. A pressure vessel closure as defined by claim 5 wherein
   said vent means comprises an upwardly extending vent member on said cover member forming a fluid passageway from below said cover member to above said cover member, and
   said vent cover means comprises a member having a portion adapted to sealingly engage said vent member at one position of said vent cover means and to engage said vent member without sealing at a second position, and has means thereon engageable with said latch securing means at said first position to prevent operation of said latch securing means to release said latch means.

8. A pressure vessel closure as defined by claim 7 wherein
   said latch means comprises a plurality of radially movable segments engageable with said presure vessel to hold the cover upon radially outward movement, and disengageable therefrom on radially inward movement, and
   said latch securing means has a portion secured to prevent radially inward movement of said segments by said vent cover in said one position.

9. A pressure vessel closure as defined by claim 4 and including
   a lifting device on said cover member engageable with said pressure vessel to lift said cover member far enough for the O-ring to clear the opening in which it seals.

10. A pressure vessel closure comprising
    a cover member having a pressure side and a side for exposure to the atmosphere,
    an annular flange circumscribing the atmosphere side,
    a pressure-enhanced seal circumscribing the portion of the portion of the cover member between the flange and the pressure side,
    and means on said cover member to secure said cover member to a pressure vessel.

References Cited

UNITED STATES PATENTS

| | | | |
|---|---|---|---|
| 1,144,152 | 6/1915 | Miller | 220—55 |
| 1,659,202 | 2/1928 | Jewell | 220—55.3 |

THERON E. CONDON, *Primary Examiner.*

G. T. HALL, *Assistant Examiner.*